United States Patent
Wendt (10) Patent No.: US 7,602,936 B2
(45) Date of Patent: Oct. 13, 2009

(54) METHOD TO MAKE WAVELET WATERMARKS RESISTANT TO AFFINE TRANSFORMATIONS

(75) Inventor: Peter D. Wendt, Mahwah, NJ (US)

(73) Assignees: Sony Corporation (JP); Sony Electronics Inc., Park Ridge, NJ (US)

( * ) Notice: Subject to any disclaimer, the term of this patent is extended or adjusted under 35 U.S.C. 154(b) by 699 days.

(21) Appl. No.: 10/885,976

(22) Filed: Jul. 7, 2004
(Under 37 CFR 1.47)

(65) Prior Publication Data
US 2005/0123169 A1 Jun. 9, 2005

Related U.S. Application Data

(63) Continuation-in-part of application No. 10/162,838, filed on Jun. 5, 2002, now Pat. No. 6,865,273, and a continuation-in-part of application No. 09/802,244, filed on Mar. 8, 2001, now Pat. No. 6,795,565.

(51) Int. Cl.
G06K 9/00 (2006.01)
G06K 9/64 (2006.01)
H04N 1/40 (2006.01)

(52) U.S. Cl. ............... 382/100; 382/123; 382/232; 358/3.28

(58) Field of Classification Search ............... 382/100, 382/123, 232; 358/3.28
See application file for complete search history.

(56) References Cited

U.S. PATENT DOCUMENTS 4,313,984 A 2/1982 Moraw et al.
5,084,790 A 1/1992 Endoh
5,144,658 A 9/1992 Takahashi
5,809,139 A 9/1998 Girod et al.
5,862,260 A * 1/1999 Rhoads ................. 382/232
5,915,027 A 6/1999 Cox et al.

(Continued)

FOREIGN PATENT DOCUMENTS

| EP | 0778566 | 6/1997 |
|----|---------|--------|
| JP | 2001-078010 A | 3/2001 |
| WO | WO 97/26733 | 7/1997 |
| WO | 01/59689 | 8/2001 |
| WO | 02/093930 | 11/2002 |
| WO | 2006/073497 | 7/2006 |

OTHER PUBLICATIONS

Langelaar, G.C, Setyawan, I. and Langendijk, R.L.: "A State-of-the-Art Overview" IEEE Signal Processing Magazine, IEEE Service Center, Piscataway, NJ, US, vol. 17, No. 5, Sep. 2000, pp. 20-46.

(Continued)

*Primary Examiner*—Bhavesh M Mehta
*Assistant Examiner*—Gandhi Thirugnanam
(74) *Attorney, Agent, or Firm*—Lerner, David, Littenberg, Krumholz & Mentlik, LLP (57) ABSTRACT

A method and/or apparatus for embedding and detecting watermarks in a set of data frames, where a secondary domain is used for combining the data frame, watermark, and a geometric pattern for holding the watermark, and that secondary domain is used for post-combination filtering of the modified data frame. The secondary domain is preferably a wavelet domain or sub-band domain. The geometric pattern for holding the watermark is reversibly mapable between a complex pattern in the original domain of the data frame and a simple pattern in the secondary domain where combination and filtering takes place.

41 Claims, 8 Drawing Sheets

U.S. PATENT DOCUMENTS

| | | | |
|---|---|---|---|
| 5,930,369 A * | 7/1999 | Cox et al. ............. 380/54 |
| 6,047,374 A | 4/2000 | Barton |
| 6,108,434 A | 8/2000 | Cox et al. |
| 6,141,441 A | 10/2000 | Cass et al. |
| 6,282,299 B1 | 8/2001 | Tewfik et al. |
| 6,282,300 B1 * | 8/2001 | Bloom et al. ............. 382/100 |
| 6,381,341 B1 | 4/2002 | Rhoads |
| 6,385,329 B1 * | 5/2002 | Sharma et al. ............. 382/100 |
| 6,404,926 B1 | 6/2002 | Miyahara et al. |
| 6,424,725 B1 | 7/2002 | Rhoads |
| 6,442,283 B1 | 8/2002 | Tewfik et al. |
| 6,463,162 B1 | 10/2002 | Vora |
| 6,556,689 B1 | 4/2003 | Xia et al. |
| 6,563,937 B1 | 5/2003 | Wendt |
| 6,567,533 B1 | 5/2003 | Rhoads |
| 6,678,422 B1 * | 1/2004 | Sharma et al. ............. 382/240 |
| 6,680,972 B1 | 1/2004 | Liljeryd et al. |
| 6,700,990 B1 * | 3/2004 | Rhoads ............. 382/100 |
| 6,738,493 B1 * | 5/2004 | Cox et al. ............. 382/100 |
| 6,795,565 B2 * | 9/2004 | Wendt ............. 382/100 |
| 6,845,170 B2 * | 1/2005 | Wendt ............. 382/100 |
| 6,985,601 B2 * | 1/2006 | Wendt ............. 382/100 |
| 2001/0036292 A1 | 11/2001 | Levy et al. |
| 2002/0032698 A1 | 3/2002 | Cox |
| 2002/0090107 A1 | 7/2002 | Acharya et al. |
| 2003/0012402 A1 | 1/2003 | Ono |
| 2003/0021439 A1 | 1/2003 | Lubin et al. |
| 2003/0215112 A1 | 11/2003 | Rhoads et al. |
| 2003/0219144 A1 | 11/2003 | Rhoads et al. |
| 2006/0120559 A1 * | 6/2006 | Levy ............. 382/100 |
| 2007/0019836 A1 * | 1/2007 | Thorwirth ............. 382/100 |
| 2007/0165852 A1 * | 7/2007 | Roberts ............. 380/201 |

OTHER PUBLICATIONS

Shelby Pereira et al: "Fast Robust Template Matching for Affine Resistant Image Watermarks" Information Hiding Lecture Notes in Computer Science;;LNCS, Springer Berlin Heidelberg, BE, vol. 1768, 2000, pp. 199-210.

Tefas, A., et al., "Multi-Bit Image Watermarking Robust To Geometric Distortions," IEEE Article, pp. 710-713, 2000.

Pereira, S., et al., "Template Based Recovery of Fourier-Based Watermarks Using Log-polar and Log-log Maps," IEEE Article, pp. 870-874, 1999.

Delannay, D., et al., "Generalized 2-D Cyclic Patterns For Secret Watermark Generation," IEEE Article, pp. 77-79, 2000.

Linnartz, J., et al., "Detecting Electronic Watermarks In Digital Video," Phillips Researchpp. 1-4.

Petitcolas, F., et al., "Information Hiding—A Survey," IEEE Article, pp. 1062-1078, 1999.

Hel-Or, H.Z., et al., "Geometric Hashing Techniques For Watermarking," IEEE Article, pp. 498-501, 2001.

Pereira S., et al., "Transform for Digital Image Watermarking,".

Alghoniemy, M., et al., "Image Watermarking By Moment Invariants," IEEE Article, pp. 73-76, 2000.

Su et al., "Synchronized Detection of the Block-based Watermark with Invisible Grid Embedding," Proc. SPIE vol. 4314: Security and Watermarking of Multimedia Contents III, Jan. 2001, pp. 406-417.*

Kusanagi et al., "An Image Correction Scheme for Video Watermarking Extraction," IEICE Trans. Fundamentals, vol. E.84-A, No. 1, Jan. 2001, pp. 273-280.*

Licks, V., et al., "On Digital Image Watermarking Robust To Geometric Transformations," IEEE Article, pp. 690-693, 2000.

Lu, C., et al., "Video Object-Based Watermarking: A Rotation and Flipping Resilient Scheme," IEEE Article, pp. 483-486, 2001.

Burak Ozer, I., et al., "A New Method For Detection Of Watermarks In Geometrically Distorted Images," IEEE Article, pp. 1963-1966, 2000.

Maes, M., et al., "Exploiting Shift Invariance to Obtain a High Payload in Digital Image Watermarking," IEEE Article, pp. 7-12, 1999.

Braudaway, et al., "Automatic recovery of invisible image watermarks from geometrically distorted images," Proc. SPIE Vo. 3971: Security and Watermarking Multimedia Contents II, Jan. 2000, pp. 74-81.

Voloshynoskiy, S., et al., "Multibit Digital Watermarking Robust Against Local Nonlinear Geometrical Distortions," IEEE Article, pp. 999-1002, 2001.

Tsekeridou, S., et al., "Wavelet-Based Self-Similar Watermarking For Still Images," IEEE Article, pp. I-220-I-223, 2000.

Hong, M., et al., "A Private/Public Key Watermarking Technique Robust To Spatial Scaling," IEEE Article, pp. 102-103, 1999.

Delannay, D., et al., "Compensation of Geometrical Deformations for Watermark Extraction in the Digitial Cimena Application," Proc. SPIE vol. 4314: Security and Watermarking of Multimedia Contents III, Jan. 2001, pp. 149-157.*

Ni, Z., et al., "Enhancing Robustness of Digital Watermarking against Geometric Attack Based on Fractal Transform," IEEE Article, pp. 1033-1036, 2000.

Lin, C., et al., "Rotation, Scale, and Translation Resilient Watermarking for Images," IEEE Article, pp. 767-782, 2001.

Solachidis V., et al., "Circularly Symmetric Watermark Embedding in 2-D DFT Domain," IEEE Article, pp. 3469-3472, 1999.

Tsekeridou, S., et al., "Copyright Protection of Still Images Using Self-Similar Chaotic Watermarks," IEEE Article, pp. 411-414, 2000.

Caldelli, R., et al., "Geometric-invariant Robust Watermarking Through Constellation Matching In The Frequency Domain," IEEE Article, pp. 65-68, 2000.

Termont, P., et al., "Performance Measurements of a Real-time Digital Watermarking System for Broadcast Monitoring," IEEE Article, pp. 220-224, 1999.

Berghel, et al., "Protecting ownership rights through digital watermarking," Internet Kiosk, XP000613936, Jul. 1996, pp. 101-103.

Anderson, R., et al., "Information Hiding An Annotated Bibliography," Computer Laboratory, University of Cambridge, pp. 1-62.

Mora-Jimenez, I., et al., "A New Spread Spectrum Watermarking Method With Self-Synchronization Capabilities," IEEE Article, pp. 415-418, 2000.

Termont, P., et al., "How To Achieve Robustness Against Scaling In A Real-Time Digital Watermarking System For Broadcast Monitoring," IEEE Article, pp. 407-410, 2000.

Su et al., "A Content-Dependent Spatially Localized Video Watermark for Resistance to Collusion and Interpolation Attaches," IEEE Proc. Int. Conf. on Image Processing, vol. 1, Oct. 2001, pp. 818-821.*

Alghoniemy, M., et al., "Geometric Distortion Correction Through Image Normalization," Proc. IEEE Int. Conf. on Multimedia and Expo 2000, vol. 3. Jul./Aug. 2000, pp. 1291-1294.*

Chotikakamthorn, N., et al., "Ring-shaped Digital Watermark for Rotated and Scaled Images Using Random-Phase Sinusoidal Function," IEEE Article, pp. 321-325, 2001.

Kutter, M., "Towards Affine Invariant Image Watermarking Schemes," Swiss Federal Institute of Technology, Lausanne, pp. 1-27.

Kaewkamnerd, N., et al., "Wavelet Based Watermarking Detection Using Multiresolution Image Registration," IEEE Article, pp. II-171-II-175, 2000.

Cox, et al.,"Secure Spread Spectrum Watermarking for Multimedia," NEC Research Institute Technical Reports, 1995, pp. 1-33.

Kutter, M., et al., "Towards Second Generation Watermarking Schemes," IEEE Article, pp. 320-323, 1999.

Pereira, S., et al., "Robust Template Matching for Affine Resistant Image Watermarks," IEEE Article, pp. 1123-1129, 2000.

O Ruanaidh, J., et al., "Rotation, Scale and Translation Invariant Digital Image Watermarking," IEEE Article, pp. 536-539, 1997.

Loo et al., "Motion estimation based registration of geometrically distorted images for watermark recovery," Proc. SPIE vol. 4314: Security and Watermarking of Multimedia Contents III, Jan. 2001, pp. 606-617.*

Kutter, M., "Watermarking Resisting to Translation, Rotation, and Scaling," Signal Processing Laboratory, Swiss Federal Institute of Technology.

* cited by examiner

METHOD TO MAKE WAVELET WATERMARKS RESISTANT TO AFFINE TRANSFORMATIONS

CROSS-REFERENCE TO RELATED APPLICATIONS

The present application is a continuation-in-part of U.S. patent application Ser. No. 09/802,244, entitled METHOD TO DETECT WATERMARK RESISTANT TO RESIZING AND TRANSLATION, filed on Mar. 8, 2001 now U.S. Pat. No. 6,795,565, assigned to the assignee of the present application and incorporated by reference in its entirety in the present application. The present application is also a continuation-in-part of U.S. patent application Ser. No. 10/162,838, entitled METHOD AND APPARATUS TO DETECT WATERMARK THAT ARE RESISTANT TO RESIZING, ROTATION AND TRANSLATION, filed on Jun. 5, 2002 now U.S. Pat. No. 6,865,273, assigned to the assignee of the present application and incorporated by reference in its entirety into the present application.

FIELD OF THE INVENTION

The present invention relates to watermarks that form part of the content of an information signal including, for example, video, audio or image content. More particularly, this invention relates to media having information signals with embedded watermarks and methods and devices for creating, detecting and preserving such watermarks.

BACKGROUND OF THE INVENTION

A watermark is a special-purpose low-level identifier signal added to another content signal, typically for the purpose of digital rights management, authentication, identification and tagging, source location, steganographic data or command hiding, broadcast tracking, tamper detection. Thus, watermarking is the embedding of identifier information in content information signals, and the like. The "carrier" signal or content signal may be audio, an image, video, enriched text data, and the like. Usually, the watermark is designed to be essentially imperceptible, but so that it may be detected reliably by signal processing.

A typical method to detect a watermark is through use of a matched filter or correlation detector. Given a watermarked signal, samples are taken of the watermarked signal and every such sample is multiplied by a corresponding sample of the watermark pattern. The sum the products of the samples are then taken. If the sum of products is large, the watermark pattern is detected.

Previous attempts have been made to create robust watermarks for copy protection of audio-visual data that are resistant to efforts to overcome such watermarks and copy the accompanying data. Some of these attempts involve the use of log-polar coordinates and Fourier and Mellin transforms for image processing and registration. Data can be converted from normal Cartesian coordinates to log-polar coordinates through a known algorithm, which typically requires coordinate transformation from normal Cartesian coordinates (x, y) to polar coordinates (R, θ) and then to log-polar coordinates (L, θ) by taking the log of the radius after the coordinates have been converted from Cartesian to polar.

Unfortunately, these existing watermarking systems have various drawbacks. First, they require that the watermark be embedded in a particular transform domain for it to be resistant to geometric transformations. This limits the flexibility in the design of the watermark, and so these techniques cannot be incorporated into a previously designed watermarking system to improve it.

Second, these watermarking systems have been criticized for only being robust to geometric transformations, but not to other attacks such as noise addition. The technical reason is that these systems obtain geometric robustness by embedding the watermark in the magnitude of a Fourier transform. This transform magnitude is invariant to spatial shifts in the input to the transform, but it is easy to modify and attack. On the other hand, it is well known in image processing that the phase of the Fourier transform of an image contains most of the information in the image. It is possible to completely change the magnitude of the transform, inverse transform the magnitude and phase, and still see much of the content of the original image.

Other approaches embed simple patterns, or complete watermarks, at known positions in images or video frames, and then detect these patterns or watermarks and their positions to compute and account for any rotation, resizing, or other geometric alteration. A system that uses these approaches may not require any frequency transforms or log-polar mappings. Thus, the general idea appears attractive. Also, helper patterns or watermarks can be added to a pre-existing watermark, as long as they do not interfere. In this way, geometric robustness can be added to a pre-existing watermark system.

Unfortunately, such approaches also have drawbacks. For example, there is a tradeoff between robustness and ease of detection of the helper patterns or watermarks. A simple helper pattern may be easy to detect even after it has been geometrically altered—this makes geometric robustness for the main watermark easy to attain, but also makes the helper pattern easy to find and attack. Then, the robustness of the main watermark to geometric manipulations is defeated.

On the other hand, the helper patterns may actually be watermarks, which are harder to remove, but also much harder to detect. If the helper watermarks are arbitrary, exhaustive searches may be required over some geometric parameters (such as the angle of rotation). In a sense, such systems merely shift the problem of robustness from the parent watermark to the helper patterns or watermarks.

If any geometric modification of image or video frames occurs after the watermark embedder, an unassisted watermark detector or decoder will not correctly discern the watermark. The most common such modifications are resizing, spatial translation or shift, rotation, shear, and cropping. Combinations of the first four types produce all so-called affine geometric transformations. Cropping can be used to trim an image to a particular size after an affine transformation, and to avoid blank areas near the edges of the image frame. These modifications can occur as part of normal processing, such as video format conversion, or a hacker wishing to defeat the watermark may apply them maliciously.

In particular, in classical matched filter detectors, if an input frame is geometrically altered, then the embedded watermark will not align with the "reference" watermark pattern known to the detector, and the detector may fail.

One solution for increasing the efficiency and efficacy of watermark embedding and detection is through the use of a wavelet domain for embedding watermarks, such as described, for example, in U.S. Pat. No. 5,930,369 to Cox, et al., and entitled SECURE SPREAD SPECTRUM WATER-MARKING FOR MULTIMEDIA DATA. However, even watermarks embedded in a wavelet domain may have inadequate robustness against geometric alterations to watermarked data. This and other difficulties created by wavelet domain watermark embedding are discussed below.

Generally speaking, a wavelet or sub-band transform divides an image into spatial frequency bands (Generally, wavelets use octave bands, whereas sub-band transforms can have almost arbitrary band divisions). The low-frequency bands contain smooth areas and large shapes from the image, whereas the high-frequency bands contain detail such as lines, edges, and small spots. The human eye analyzes scenes in a similar way. Therefore, wavelets and sub-bands provide control when embedding a watermark into images and video, since they provide flexibility in embedding the watermark to maximize robustness or payload, while typically minimizing visibility of the watermark once embedded.

However, embedding a watermark in a frequency band is similar to frequency-shifting the watermark to the center frequency of a band. This can make the original pattern highly oscillatory, and, unfortunately, this makes geometric robustness more difficult to attain.

In the inventor's prior U.S. patent application Ser. No. 09/802,244, entitled METHOD TO DETECT WATERMARK RESISTANT TO RESIZING AND TRANSLATION, filed on Mar. 8, 2001, assigned to the assignee of the present application and incorporated by reference in its entirety in the present application, one solution to the above-described problem is provided. In particular, the method of that application provides that the watermark patterns are added directly to the image or video pixels. As a result, geometric robustness depends on the simple structure of the patterns.

In addition, in the inventor's prior U.S. patent application Ser. No. 10/162,838, entitled METHOD AND APPARATUS TO DETECT WATERMARK THAT ARE RESISTANT TO RESIZING, ROTATION AND TRANSLATION, filed on Jun. 5, 2002, assigned to the assignee of the present application and incorporated by reference in its entirety in the present application, a further robustness solution is described. Specifically, that application provides for robustness of a watermark embedded in data that was subject to varying combinations of resizing, shift, and rotation. However, the solution of that application is incomplete with respect to broader geometric transformations such as general affine geometric transformations, including, for example, shear.

Following these methods, in order to detect embedded watermarks, filtering of watermarked data is employed. Then, Fourier transforms are used to extract a repetitive "grid" of blocks in which the watermark to be extracted is embedded. The mathematics to compute the size, position, and orientation coordinates of the grid are computed from the locations and phases of the significant peaks in the summed output of the Fourier transforms. From the coordinates of the grid recovered from the transformed watermark data, the original watermark signal can thus be obtained.

A desirable feature of these prior methods is that the geometry estimation for the repetitive "grid" of blocks is independent of the payload embedded in the watermark itself. Otherwise, a more difficult problem might result, wherein the watermark pattern and the geometric parameters might have to be estimated jointly.

SUMMARY OF THE INVENTION

One aspect of the invention includes performance of filtering and processing of data frames after embedding of a watermark in the frame, rather than before.

Another aspect of the invention includes an improved watermark detection method that is less prone to error caused by noise or other interference or non-ideal factors, via the use of a geometric pattern embedded in the frame data that reversibly maps from a simple pattern in one domain to a complex pattern in another domain.

Another aspect of the invention includes the reduction in computation required and the increase in robustness of geometric patterns with embedded watermarks therein through restricting the ranges of geometric parameters used in determination of geometric pattern coordinates.

Yet another aspect of the invention includes transforming both the original data frame and the geometric pattern including a watermark to a new domain in order to embed the geometric pattern into the data frame and filter the modified data frame in order to enhance the watermark and suppress image content.

In one aspect, a system for embedding a watermark in a set of at least one audio-visual data frames is provided, comprising: a reversible mapping function including a forward mapping function and a reverse mapping function; a set of at least one original data frames in a first domain and a set of at least one mapped data frames in a second domain, the original data frames mapped to the second domain via the forward mapping function to form the mapped data frames; a geometric watermark pattern, the geometric watermark pattern representing a simple pattern in the second domain and a complex pattern in the first domain; a watermark signal, the watermark signal representing data other than the original data frames; a combined watermark pattern, the combined watermark pattern formed from the watermark signal combined with the geometric watermark pattern in the second domain; and, a set of at least one final data frames, the final data frames formed from the reverse mapping function of the mapped data frames joined with the combined watermark pattern.

In another aspect of the invention, a method for detecting a watermark signal embedded in a plurality of watermarked data frames of audio-visual data, comprising: providing a plurality of watermarked frames in a first domain, the plurality of watermarked frames including embedded therein a combined watermark pattern, the combined watermark pattern including a geometric watermark pattern and a watermark signal; mapping the plurality of watermarked frames into a second domain via a fixed reversible mapping function to form a plurality of mapped watermarked frames, wherein the geometric watermark pattern comprises a complex pattern in the first domain and a simple pattern in the second domain, the simple pattern and the complex pattern reversibly mapped via the reversible mapping function; and, detecting the geometric watermark pattern from the plurality of watermarked frames in the second domain in order to recover the watermark signal.

In one further aspect of the present invention, the method further comprises the step of pre-filtering the mapped watermarked data frames in the second domain to remove at least part of the mapped watermarked data frame without substantially removing the combined watermark pattern.

In another further aspect of the invention, the method further comprises the step of summing at least a first mapped watermarked data frame and a second watermarked data frame of the mapped watermark data frames to form at least one summary frame, wherein the detection step employs the at least one summary frame of the mapped watermark data frames.

An embodiment of a system for embedding a watermark in a set of at least one presentation data frames of the present technology may include (1) a reversible mapping function for transforming a signal between a first domain and a second domain; (2) a set of at least one original presentation frames transformable between the first domain and the second domain, the set of at least one presentation frames having presentation content presentable in the first domain; (3) a geometric watermark pattern transformable between the first domain and second domain, said geometric watermark pattern representing a simple identifiable pattern in the first domain and a complex pattern in the second domain; (4) a watermark signal, said watermark signal representing data other than the presentation content; (5) a combined watermark pattern, said combined watermark pattern formed from said watermark signal combined with said geometric watermark pattern and transformed to the second domain by the reversible mapping function; (5) a set of at least one final presentation frames, the set of at least one final presentation frames formed with the set of at least one original presentation frames of the first domain and the combined watermark pattern of the second domain.

An embodiment of a method for control of a signal processor for embedding a watermark signal in a set of presentation data frames of the present technology may include steps of: (1) providing a plurality of original presentation frames with a presentation content presentable in a first domain; (2) providing a combined watermark signal having a geometric design with a pattern identifiable in the first domain and a watermark signal; (3) mapping the combined watermark signal into a second domain by a reversible mapping function, the function reversible between the second domain and the first domain; (4) processing the combined watermark signal and the plurality of original presentation frames to produce a plurality of final presentation frames, the plurality of final presentation frames having the presentation content presentable in the first domain and the mapped combined watermark signal from the second domain.

Additional aspects of the invention will be apparent from an understanding of the details contained in the following description.

BRIEF DESCRIPTION OF THE DRAWINGS

For the purposes of illustrating the invention, there are shown in the drawings forms that are presently preferred, it being understood, however, that the invention is not limited to the precise arrangements and instrumentalities shown.

FIG. 1-A illustrates an embodiment of a watermark detector according to the invention.

FIG. 1-B illustrates an embodiment of a watermark embedder according to the invention.

DETAILED DESCRIPTION

Figure 1:
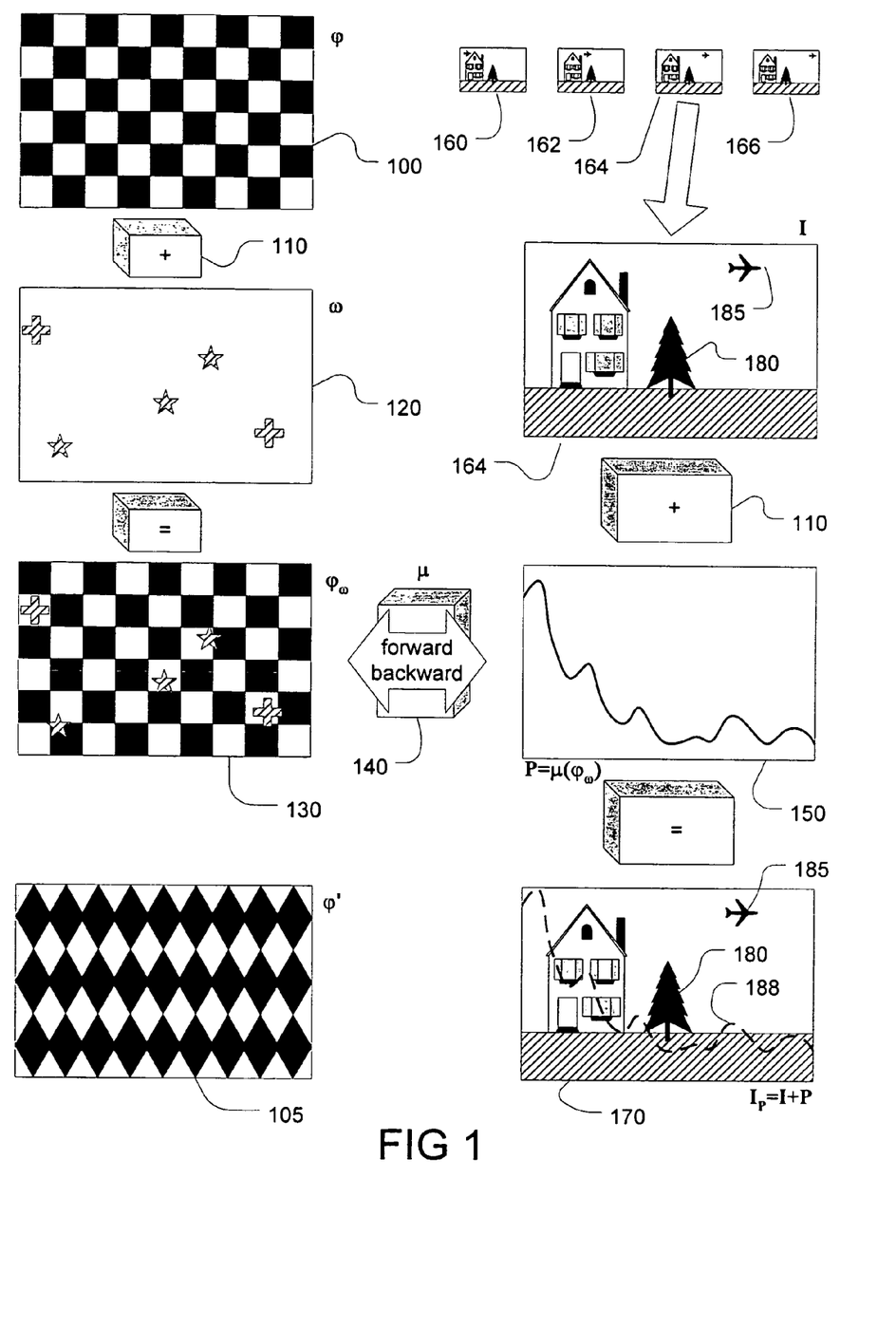
FIG. 1 is a visual representation of one embodiment of the watermark embedding system of the present invention.

The invention relates to watermarking systems including watermark embedding devices and/or watermark detecting devices. Such devices may typically include a signal processor for combining a presentation information signal such as video, audio or image data with an identifier information signal that can serve as a watermark or detecting the presence or absence of the identifier information signal from the marked presentation information signal. Referring now to the drawings wherein like numerals indicate like elements, examples of such devices are illustrated in FIGS. 1-A and 1-B.

For example, a detector device 2 may include an input device 4 to receive a watermarked presentation signal. The input device 4 may be a removable medium reader such as an optical disk device (e.g., CD or DVD reader, etc.) or a receiver such as a wireless or wired communications device (e.g., satellite receiver, network card, etc.) The detector 2 may also include a detection processor 6 to process the watermarked presentation signal to detect the presence or absence of the watermark identifier. Such a processor may be configured to contain control circuitry for carrying out any detection method as described herein or it may be configured with software executable control instructions for doing so. Such a detector may also include an output device for indicating the presence or absence of watermark identifier or otherwise carrying out a pre-determined operation in response to a command indicated by the watermark identifier. For example, the processor may be configured to exhibit the presentation signal through display and/or sound devices upon the successful detection of a watermark identifier. Such a device may include, for example, a personal computer or a video decoding device such as cable television tuner or the like.

Similarly, a watermark embedding device 10 may include an input/output device 12 for receiving an unmarked presentation information signal intended for marking with a watermark of the invention disclosed herein. A embedding processor 14 of the device may be configured with control circuitry or software for combining such an identifier information signal with the presentation information signal. Such a processor may include a computer according to the methods disclosed herein. An input/output device such as a recordable medium device (e.g., a optical writer such as a DVD or CD writer) or communications device (e.g., a network card or transmitter) may also be employed. The watermarked presentation information signal thus may be transmitted by recording it on some medium such as the removable recordable medium (e.g., optical disk or magnetic disk, etc.) or by sending it via a communications network (e.g., Internet, telecommunications network, cable or satellite communications system, etc.).

Those skilled in the art will recognize other variations and combinations of devices that may be employed to accomplish a method of the invention as described herein.

Figure 2:
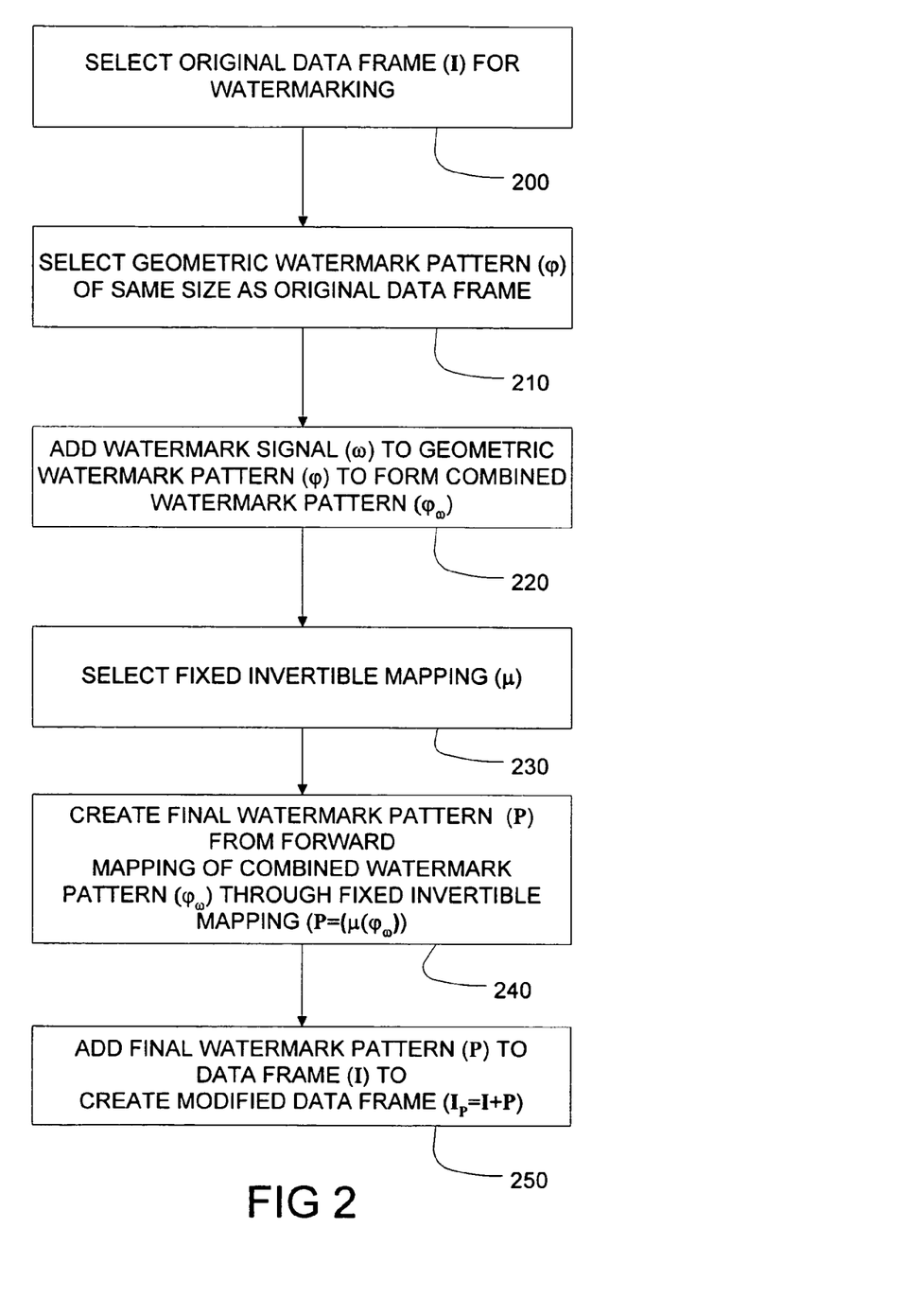
FIG. 2 is a process diagram showing one embodiment of the watermark embedding system of the present invention.

FIGS. 1 and 2 illustrate process diagrams representing one embodiment of the watermarking method of the present invention. Specifically, in this embodiment a process is employed to embed and/or detect watermarks of the present invention.

FIG. 1 is a visual representation showing one embodiment of the method of an embedder in the watermarking system of the present invention. A watermark assist pattern 100 is chosen that can be made geometrically robust as disclosed in U.S. patent application Ser. Nos. 09/162,838 or 09/802,244, called φ. For one example, φ is a pattern from a set of "random checkerboards" over a geometric pattern frame that can be mapped over a data frame. However, other regular patterns, such as, for example, a diamond simple watermark pattern 105 (φ') are possible. The simple watermark pattern φ advantageously has a frame size, defined by, for example, width and height, number of pixels, and/or bit depth, and the like. The "random checkerboard" pattern 100 is visually analogous, in one embodiment, to tiling a floor randomly with square tiles of two colors. The arrangement of the colors thus defines a particular pattern, where typically all such patterns have the same grid structure. A watermark signal 120 (φ) is advantageously combined with the simple watermark assist pattern 100 (φ), for example, via a summer 110 to make a combined watermark signal 130 ($\phi_\omega=\phi+\omega$). The combined watermark signal 130 represents some out-of-band information (information other than the data frame itself) to be conveyed with the data frame, and is represented in FIG. 1 by certain simple geometric shapes. The shapes of FIG. 1 are only used for illustrative purposes. The watermark signal 120 may be represented by any number of shapes, patterns, amplitude modulations, and the like.

Preferably, an invertible mapping 140 (μ) is selected that is exactly reversible. The invertible mapping μ maps the simple patterns such as φ or $\phi_\omega$ to complex patterns such as μ·φ or μ·$\phi_\omega$ respectively. One example of an invertible mapping u would be, for example, one band of an inverse wavelet transform.

The mapping 140 (μ) is used to create a final complex watermark pattern 150 (P), such that, for example, P=μ·$\phi_\omega$. The complex watermark pattern 150 shown in FIG. 1 is provided for illustrative purposes, and the pattern may be more complex, more simple, or not distinguishable from the background, compared to that shown in FIG. 1.

A data frame 164 (I) intended to be marked such as an image or video frame, is selected, for example, from several data frames 160, 162, 164, and 166. A video data frame, for example, has certain visual elements 180 that do not substantially vary from frame to frame, and certain motion elements 185 that tend to vary from frame to frame. A video frame also has typically a frame size, defined by, for example, frame width and height, number of pixels, and/or bit depth, and the like. The converted complex watermark pattern 150 (P) is combined with the data frame 164(I), for example, by adding via a summer 110 to the data frame 164 to create a modified data frame 170 ($I_p$=I+P).

The modified data frame 170 includes the visual elements 180, the motion elements 185, as well as the converted complex watermark pattern 150. Note that the converted complex watermark pattern 150 is shown in FIG. 1 as a dashed line in the modified frame 170 for illustrative purposes, as typically the converted complex watermark pattern 150 is not visible in the modified data frame 170.

FIG. 2 is a process diagram showing one embodiment of the watermark embedding system of the present invention similar to that described in FIG. 1. In a selection step 200 an original data frame (I) is selected for watermarking. Then, a simple watermarking assist pattern (φ) is selected that is preferably the same size as the original data frame in a watermark pattern selection step 210. In a watermark signal selection step 220, a particular watermark pattern (ω), representing some out-of-band information to be conveyed along with the data frame such as, for example, digital rights management information, authentication information, metadata information, and the like, is added to the simple watermark pattern, resulting in a combined watermark pattern ($\phi_\omega$). Then, a fixed invertible mapping (μ) is selected in a mapping selection step 230. The mapping is advantageously a perfectly reversible function. Then, in a final watermark creation step 240, a final watermark is created by mapping the combined watermark pattern ($\mu_\omega$) through the fixed invertible mapping function (μ), such that P=μ($\phi_\omega$). Finally, in a data frame modification step 250, the final watermark pattern (P) is combined with the data frame (I) to form a modified data frame ($I_p$=I+P).

Figure 3:
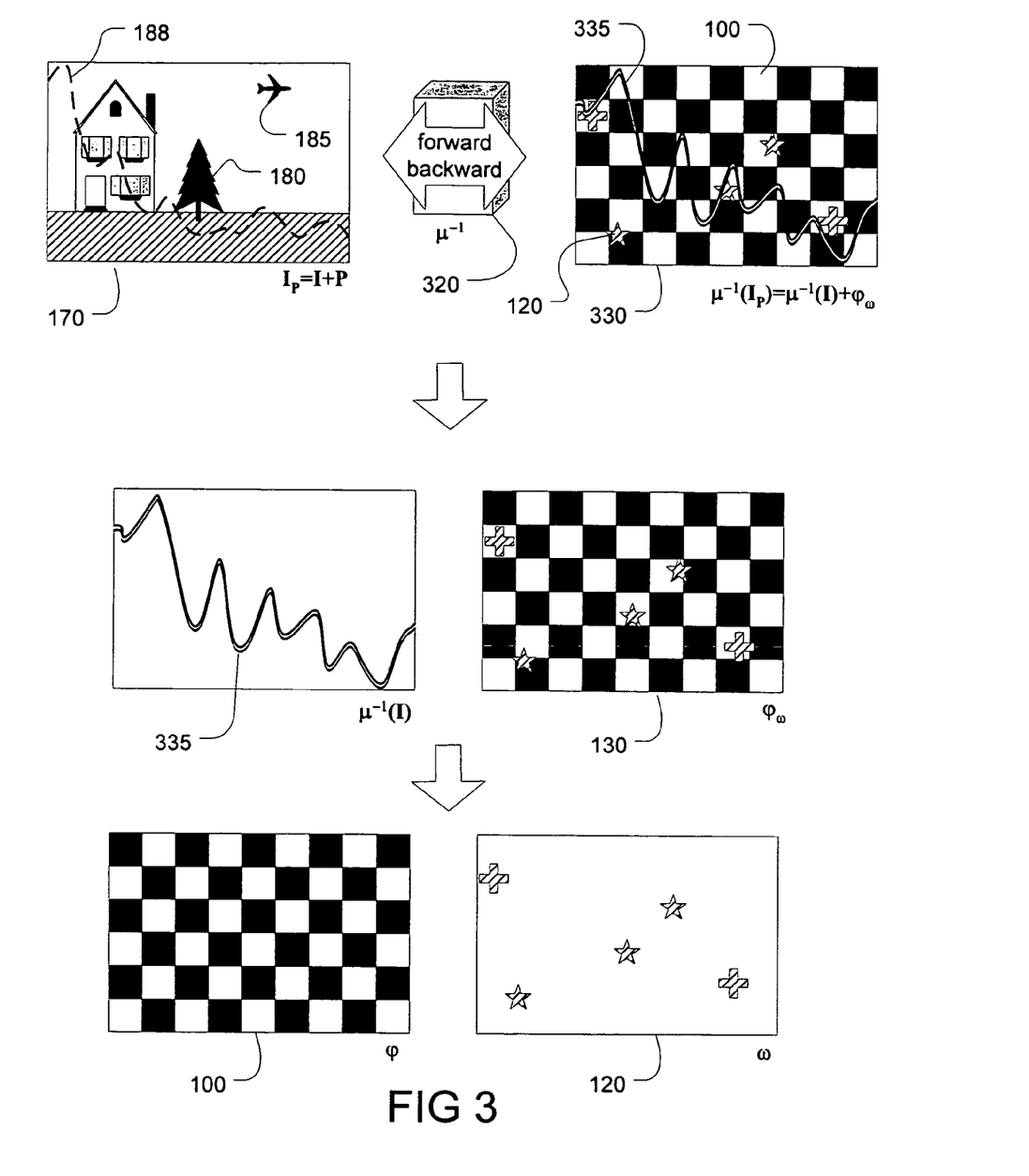
FIG. 3 is a visual representation of one embodiment of the watermark detection system of the present invention.

The next steps relate to detection or that of a method carried out by a watermark detector of the invention. In this regard, FIG. 3 is a visual representation showing one embodiment of the watermark detection method of the present invention. Before attempting to detect the watermark signal (ω), or trying to compute any geometric attack or transformation (g) (not shown, see FIG. 5) that has been performed on the modified data frame ($I_p$), we invert the modified data frame ($I_p$) with an by inverting the mapping (μ) selected previously. Thus, the inverter preferably corresponds to the mapping used during the embedding process. This inverse mapping ($\mu^{-1}$) typically relates to the original mapping for some data frame (X) according to the formula $\mu^{-1}$·μ·X=X. Such an inverse mapping may be chosen depending on the nature of any geometric attacks on the data frame. However, the inverse mapping ($\mu^{-1}$) need not be varied and thus may be a fixed inverse mapping regardless of the nature of any geometric attack, such as any affine transformation.

While generally it may be most efficient to combine the complex watermark pattern 150 with the data frame 164(I) such a result may be alternatively achieved by inverting the data frame 164 (I) utilizing the inverse mapping ($\mu^{-1}$) and adding this inverted frame with the combined watermark signal 130. The added frame may then be modified by mapping function (μ) to generate a modified data frame 170($I_p$) in accordance with the invention.

An embedded watermark signal (ω) so marked, particularly with respect to a modified data frame 170 signal that has not been subject to affine transformations, may be detected as follows. A modified data frame 170 ($I_p$), including visual elements 180, motion element 185 and (typically not visible) final watermark pattern 188 (P) is selected and transformed through an invertible mapping function 320 (e.g., inverse mapping ($\mu^{-1}$)), as has been previously described, to form an inverted modified data frame 330. The inverted modified data frame 330 includes the inverted original data frame information 335, and the combined watermark pattern 130 including the simple watermark assist pattern 100 and the watermark signal 120. In the example of inverted modified data frame 330, the inverted original data frame information 335 is shown as frequency transform data, but it can take any other form resulting from a reversible domain transform through a mapping function, such that the visual form of the inverted original data frame information 335 is provided only for purposes of this example. Similarly, the simple watermark assist pattern 100 and watermark signal 120 are shown transformed back to their original simple state for purposes of this example, as is the case if the invertible mapping function is perfectly distributive and/or commutative, although such properties are not always present.

Thus, assuming the modified data frame 170 has not been subject to geometric attack, the reverse mapping on $I_p$ occurs as follows:

$$\mu^{-1}I_p=\mu^{-1}\cdot I+\mu^{-1}\cdot\mu\cdot\phi_\omega=\mu^{-1}\cdot I+\phi_\omega \quad \text{(Eq. 1)}$$

If the modified data frame IP has been subject to an affine geometric attack g, where g is an unknown function, then for an attacked modified data frame g·$I_p$ one finds:

$$\mu^{-1}\cdot g\cdot I_p=\mu^{-1}\cdot g\cdot I+g\ \phi_\omega \quad \text{(Eq. 2)}$$

In order to isolate the combined watermark pattern 130 and—eventually—the watermark signal 120 from the inverted modified data frame 330, the inverted modified data frame 330 is processed. Optionally, the inverted modified data frame 330 may be subjected to a filter in which the inverted modified data frame 330 is operated on by one or more filters. In addition, the inverted modified data frame 330 may be sent through a summing function, in which multiple inverted modified data frames are summed and averaged to emphasize and thus simplify or improve detection of the combined watermark pattern 130 over the original data frame information 335. These filtering and summing functions may be provided in any order, and are further described in FIGS. 5-7, below.

To determine the geometry of the watermark pattern φ, preferably use methods disclosed in U.S. patent application Ser. Nos. 10/162,838 or 09/802,244, described above, and perform watermark recovery on the output of Equation 1 or Equation 2 to determine the original watermark signal ω embedded in the watermark pattern φ. In this way processing of the inverted modified data frame 330 (either before or after filtering and/or summing with other such frames) isolates and separates the watermark signal 120 from the simple watermark assist pattern 100, such that the watermark signal 120 can be used for its out-of-band informational content by an external process (not shown) for digital rights management, authentication, or other out-of-band functions.

As previously described, the use of a fixed inverse mapping μ and $\mu^{-1}$ is desirable because, otherwise, to invert the selected mapping exactly after a geometric attack, the geometric attack g would need to be known precisely. Generally, one cannot estimate the geometric attack g through many non-reversible inverse mapping, but by using a fixed inverse mapping permits, one can more readily determine the geometric attack function g via comparison with the watermark pattern $\phi_\omega$.

Figure 4:
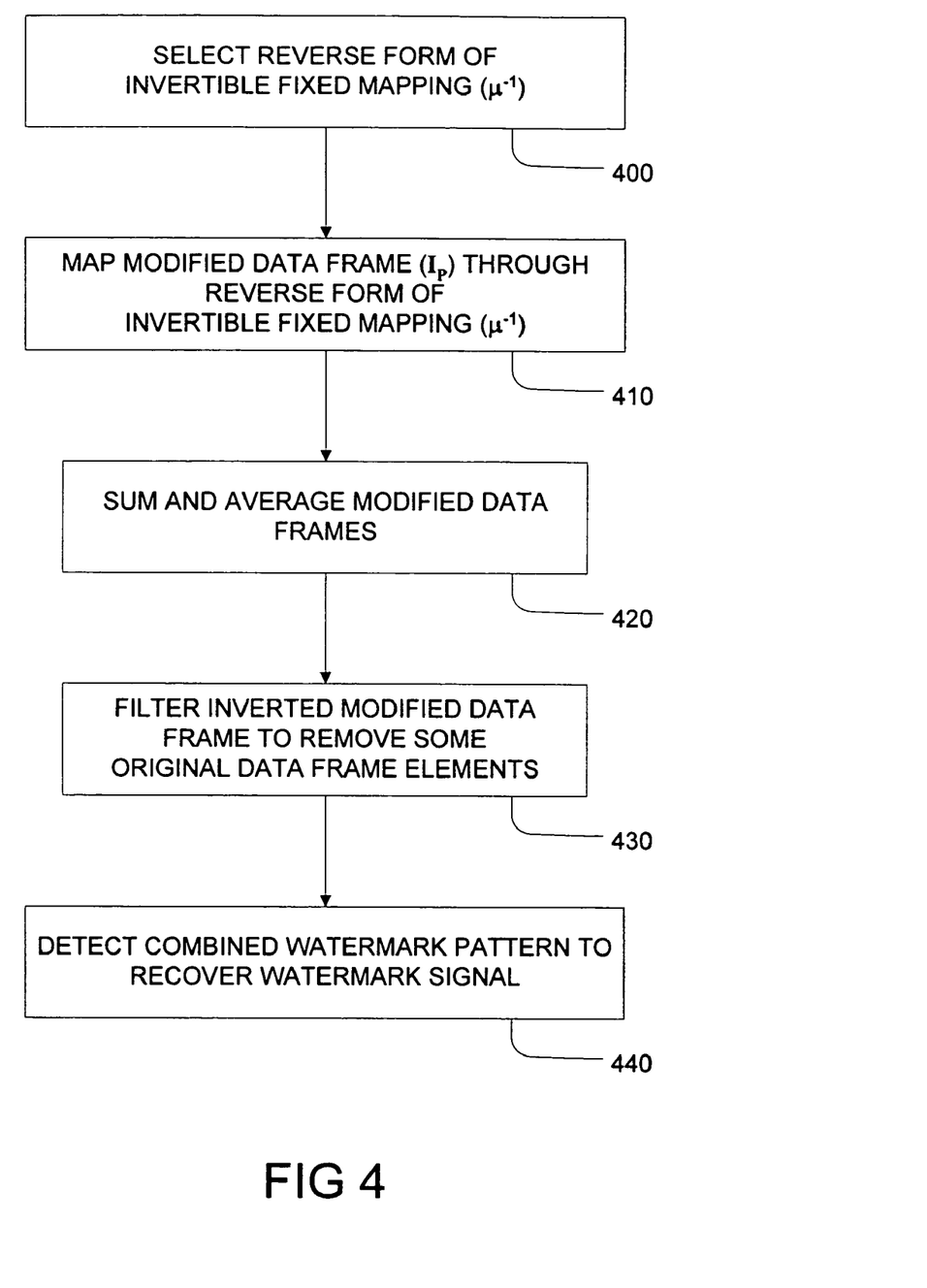
FIG. 4 is a process diagram showing one embodiment of the watermark detection system of the present invention.

FIG. 4 is a process diagram showing one embodiment of the watermark detector of the watermarking system of the present invention. In an inverse mapping function selection step 400, the inverse of the reversible mapping function 140 corresponding to that used by the watermark embedder in FIG. 2 is selected. From a modified set of data frames (such as a watermarked video including individual watermarked video frames), a modified data frame ($I_p$) is selected and inverted in a modified data frame inversion step 410. Optionally, the resulting inverted modified data frame may then be subjected to a summation step 420 with other inverted modified frames (See FIGS. 5 & 7), or this step can be skipped. The resulting inverted modified data frame may also optionally be subjected to a filtering step 430 (See FIGS. 5 & 6), or this step can be skipped. The order of these two operations, if both are performed, can be reversed. In addition, other operations to improve separation of the watermark signal from data frame content may advantageously be performed while the inverted modified data frame is in the inverted domain of the reverse mapping function. Finally, in a watermark detection step 440, the simple watermark pattern and watermark signal are isolated from the inverted modified data frame as previously described.

The current invention preferably includes all possible mappings that work with the previous inventions. These include the previously mentioned wavelet/sub-band transforms, pixel-by-pixel nonlinearities, and the like. A number of examples are discussed below.

The identity function is a trivial mapping. This shows that the current invention includes, and improves upon, the previous two applications without the need for any additional mapping function. For example the previous applications can be extended to defeat all affine geometric transformations.

Pixel operations, without filtering, are also useful. They allow the embedding of a watermark pattern adaptively into image or video frames without the complexity of filtering or Fourier transforms. For example, a watermark may be multiplicative instead of additive. If c is a scaling constant, φ is a watermark, and I is an image of the same size, then:

$$I_{P,additive} = I + c \cdot \phi \quad \text{(Eq. 3)}$$

$$I_{P,multiplicative} = I \cdot (I + c \cdot \phi) \quad \text{(Eq. 4)}$$

In addition, pixel operations and filtering operations can be combined. For example, in one embodiment, the watermark pattern φ is added to the absolute value of the wavelet coefficients of the image content in certain wavelet bands that may be bipolar (including positive and negative values).

Sub-band transforms include Fourier transforms. Fourier transforms generate very narrow frequency bands, whereas the wavelet and sub-band transforms we consider have much wider bands. A common Fourier transform will divide the horizontal or vertical spatial frequencies into 128, 256, or 1024 bands. By comparison, in one embodiment, a wavelet transform used in the present invention has only 2 bands in each direction.

One embodiment of the present invention uses such wide frequency bands to ensure simplicity and robustness to wide ranges of geometric parameters—for example, it is possible to account for resizing factors between 0.5 and 2.0. If very narrow bands were used such as found in Fourier transforms, these benefits may be reduced or disappear.

The watermark of the present invention, in one embodiment, is designed to be embedded in video compressed with motion JPEG 2000, applying the same wavelet transform of the JPEG 2000 standard. Thus, the embedder implements reversible mapping (μ) that is a JPEG 2000 wavelet transform. This simplifies the embedder when it is used with the motion JPEG 2000 compressor. The embedder is reduced to some modification of the wavelet coefficients after the transform and before binary source coding, using, for example, Huffman or arithmetic coding.

This optimization is not peculiar to motion JPEG 2000, but will work with any wavelet-based image or video compressor, so long as the watermark embedder uses the wavelet transform. The detector and the geometric estimator use the same wavelet filters as the compressor and embedder.

The implementation for JPEG 2000, a new standard for still images, and for much video, is provided as one exemplary embodiment. It is widely used to distribute motion video on the Internet, and has particular advantages over the MPEG standards such as is presently used in DVDs. First, JPEG 2000 bitstreams are bit-by-bit scaleable, so that one can merely chop off bits per compressed frame to get the desired bitrate. This is convenient for delivery of content over various networks and to various devices, especially to mobile wireless devices with small screens. Second, JPEG 2000 compressors are faster than MPEG compressors, and do not depend on interframe differences. This makes them suitable for applications such as video editing, and better suited for general-purpose compression on personal computers.

With regard to enhancement filtering or frame averaging as suggested by step 420 or 430 of FIG. 4, to improve the performance of the detection of the watermark pattern from the modified data frame 170, pre-filters may be implemented to try to suppress image content and enhance the watermark patterns. One such algorithm is described in the inventor's U.S. patent application No. [filed Jun. 30, 2004—SONYNJ 3.0-056 CONT CIP I (372)], entitled METHOD TO ENSURE TEMPORAL SYNCHRONIZATION AND REDUCE COMPLEXITY IN THE DETECTION OF TEMPORAL WATERMARKS, assigned to the assignee of the present application and hereby incorporated by reference in its entirety.

Such filters can be used for video as well—but such filters are not the only option. Instead of trying to detect a weak watermark pattern in each video frame, many video frames can be averaged pixel-by-pixel, and then the watermark can be detected in the single averaged frame. The averaging reinforces the watermark pattern, reduces noise, and blurs moving content in the original video. This assumes, of course, that the same or a similar pattern is embedded in each frame. Thus, both pre-filters and frame averaging are techniques that work well with our previous inventions. One such algorithm is described in U.S. patent application No. [filed Jul. 02, 2004—SONYNJ 3.0-056 CONT CIP II (373)], entitled METHOD TO DECODE TEMPORAL WATERMARKS IN COMPRESSED VIDEO, assigned to the assignee of the present application and hereby incorporated by reference in its entirety.

However, as previously described, because of the reversible mapping used for the current invention and its associated watermark detector, pre-filters and frame averaging operating on the input pixel frames may not necessarily work optimally with the current invention, and might actually degrade performance in some circumstances. Thus, in the present invention the filtering and averaging is preferably performed after the mapping to the "embedding domain." This is especially valuable if the mapping includes any nonlinear elements.

There are two basic reasons for this. First, the input pixels should ordinarily be mapped to the representation in which the simple original watermark patterns can be seen; this makes the behavior of the filters and frame averaging predictable. Second, in the mapped "embedding domain", the watermark is embedded by adding it to the mapped image components.

If, for example, the mapping contains any nonlinear elements, it is in this "linear" domain in which the watermark and image content are arithmetically added. This is necessary because if filtering or averaging of frames takes place in another domain (such as the original domain of the audio or video data frame, significant artifacts may be created in the "linear" domain, such that the geometric estimation and watermark detection may not work effectively.

So, in one embodiment of the invention, the filtering and frame averaging is done in the final embedding domain, rather than, for example, in the original domain of the data frame as in the inventor's previous methods.

Figure 5:
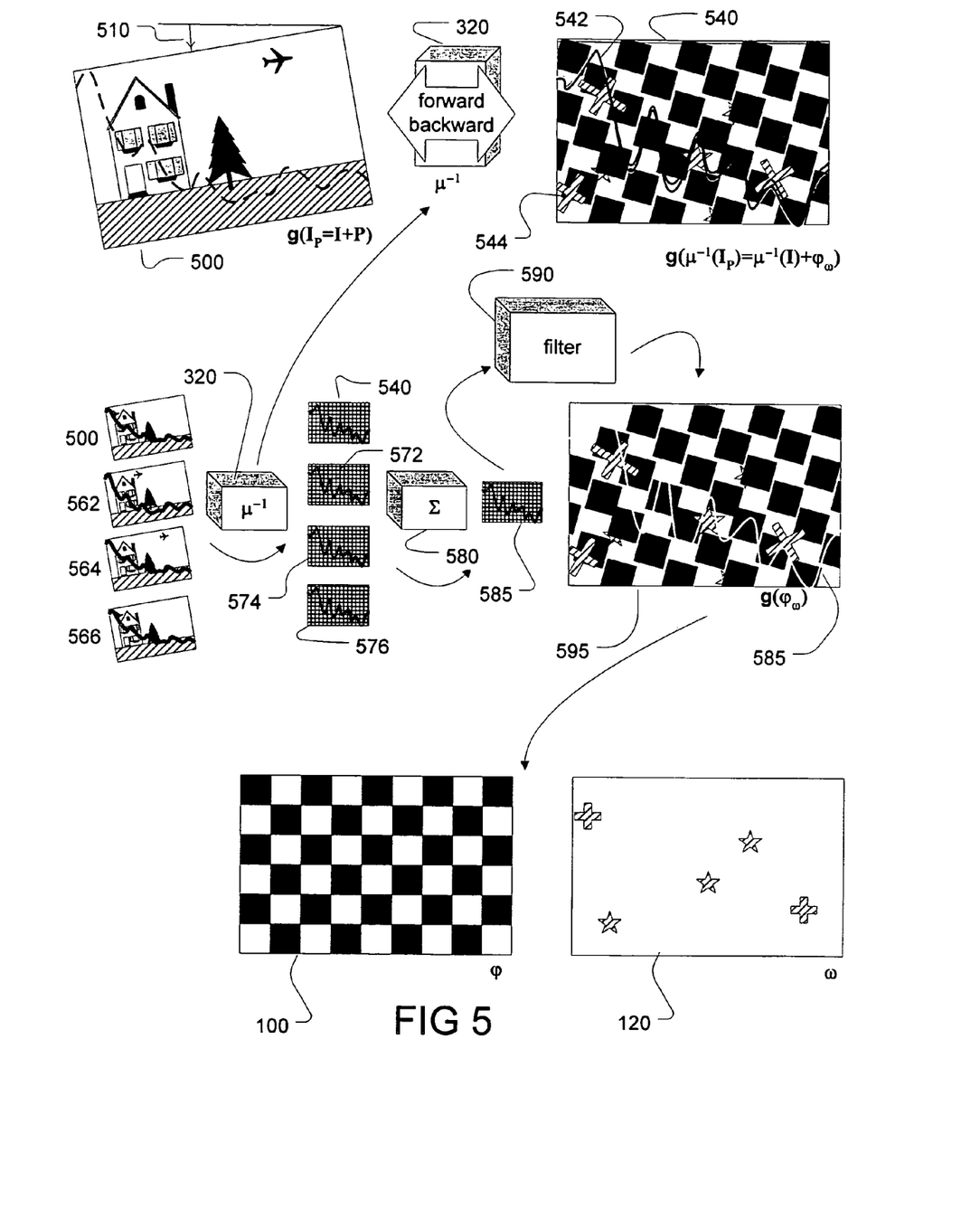
FIG. 5 is a visual representation showing one embodiment of pre-filtering and frame summing in the present invention.

FIG. 5 is a visual representation of watermark detection after geometric affine distortion in one embodiment of the present invention. A distorted modified data frame 500 includes, for example, a geometric affine distortion such as an angular rotation 510 to an angle a. The distorted modified data frame 500 includes, for example, visual elements 185, motion element 180, and a (generally not visible) final watermark pattern 528, wherein all of these elements are affected by the affine transformation 510. In order to detect the watermark signal embedded in the data frame 500, an inverse mapping 320 ($\mu^{-1}$) (i.e., inverse transform) as previously described as the inverse of the reversible mapping (p) (i.e., reversible transform) used in encoding, is applied. The result is an inverted distorted modified data frame 540. In the inverted distorted modified data frame 540, the distorted data frame information 542 is represented by the transformed information line, while the distorted simple watermark pattern 546 is represented by the modified checkerboard pattern and the distorted watermark signal 544 is represented by the distorted watermark signal shapes. The representations in the inverted distorted modified data frame 540 are for purposes of explanation, and the actual forms will vary greatly based on the mapping function, type of affine transformation or distortion, and the particular characteristics of the original data frame, simple watermark pattern, watermark signal, and the like.

In this embodiment, the resulting inverted distorted modified data frame 540 is applied to a summer 550. In the summer 550, a window of multiple distorted modified data frames 562, 564 and 566, having been inverted via the inverse mapping function 535, form a window of multiple inverted distorted modified data frames 572, 574 and 576 with inverted distorted modified data frame 540. The resulting set of inverted distorted modified data frames 540, 572, 574 and 576 are, summed to form a composite window data frame 585.

The resulting filtered window 595 includes parts of the original data frame information 592, the (distorted) simple watermark pattern 546, and the watermark signal 544. The filtered frame 595 is processed, for example by the methods disclosed in U.S. patent application Ser. Nos. 10/162,838 or 09/802,244, wherein the original simple watermark pattern 100 and the original embedded watermark signal 120 may be detected.

Figure 6:
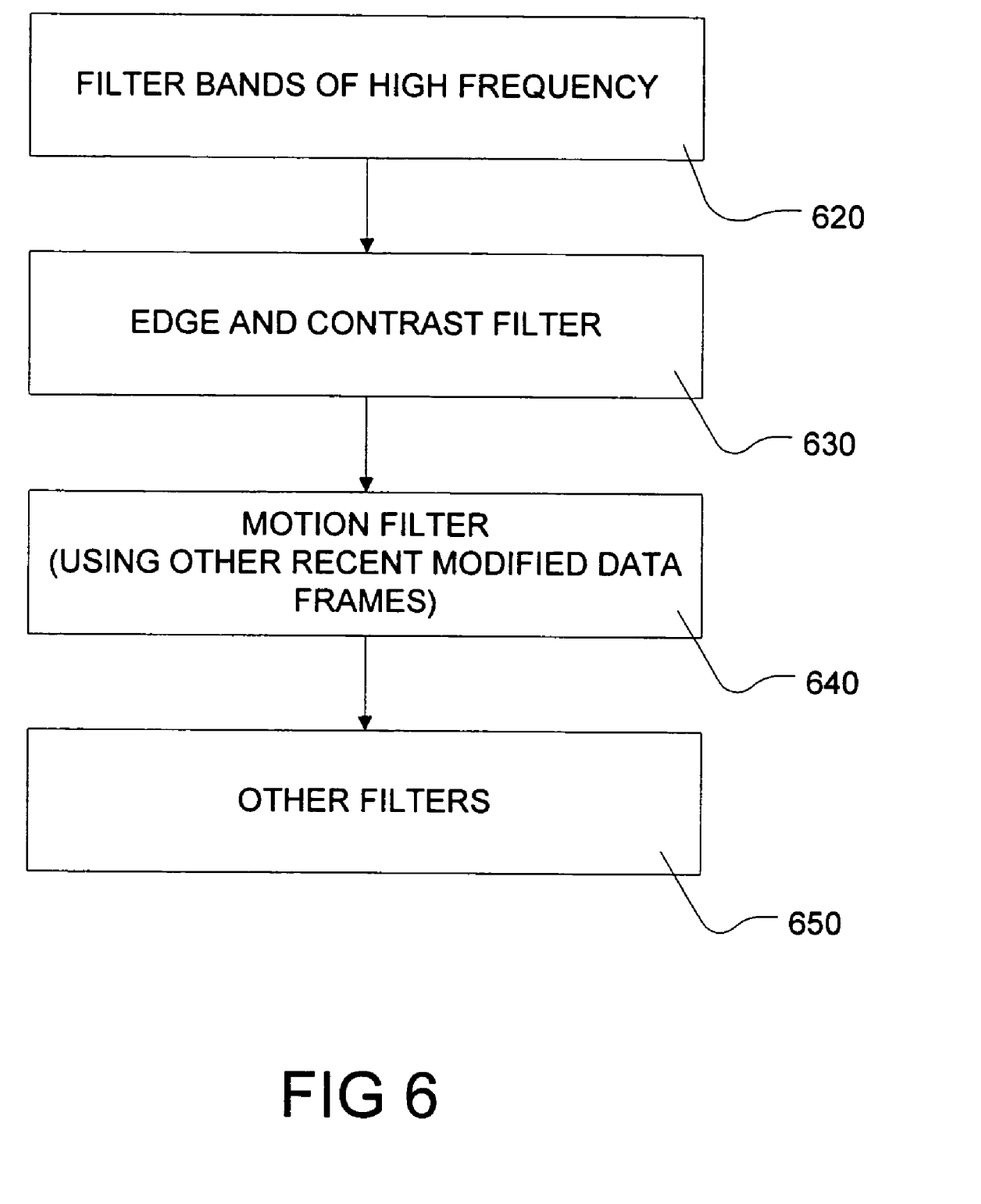
FIG. 6 is a process diagram showing one embodiment of pre-filtering in the present invention.

FIG. 6 is a diagram showing one embodiment of filtering process in the present invention applied on one or more inverted distorted modified data frame 540. After the inverse mapping, the inverted modified data frame 540 is put through a frequency band filter step 620, in which certain bands (selected in a particular domain based on the qualities of that domain) are filtered out based on predominantly original data frame information contained therein. Similarly, the inverted modified data frame may be subjected to an edge and contrast filter step 630 wherein sharp edges and high contrast information from the inverted modified data frame are removed to the extent they substantially represent original data frame information.

In addition, the inverted modified data frame may be put through a motion filter step 640 in which differences between individual inverted modified data frames in a window of inverted modified data frames are removed based on the fact that such differences principally represent motion in the original data frame information. Additional filters can be applied in another filter step 650. These filters are described in detail in the present inventor's U.S. patent application Ser. No. 09/996648, entitled METHOD AND APPARATUS TO DETECT WATERMARK THAT ARE RESISTANT TO ARBITRARY DEFORMATIONS, now U.S. Pat. No. 6,563,937, assigned to the assignee of the present application and hereby incorporated by reference in its entirety, U.S. patent application No. 10/884,832, filed Jul. 2, 2004, now U.S. Pat. No. 7,317,811, entitled METHOD TO DECODE TEMPORAL WATERMARKS IN COMPRESSED VIDEO and U.S. patent application Ser. No. 10/882,055, filed Jun. 30, 2004, entitled METHOD TO ENSURE TEMPORAL SYNCHRONIZATION AND REDUCE COMPLEXITY IN THE DETECTION OF TEMPORAL WATERMARKS, assigned to the assignee of the present invention and hereby incorporated by reference in its entirety. After applying some or all of such filtering steps, summing of multiple frames may be applied as necessary and the combined watermark pattern may be detected.

Figure 7:
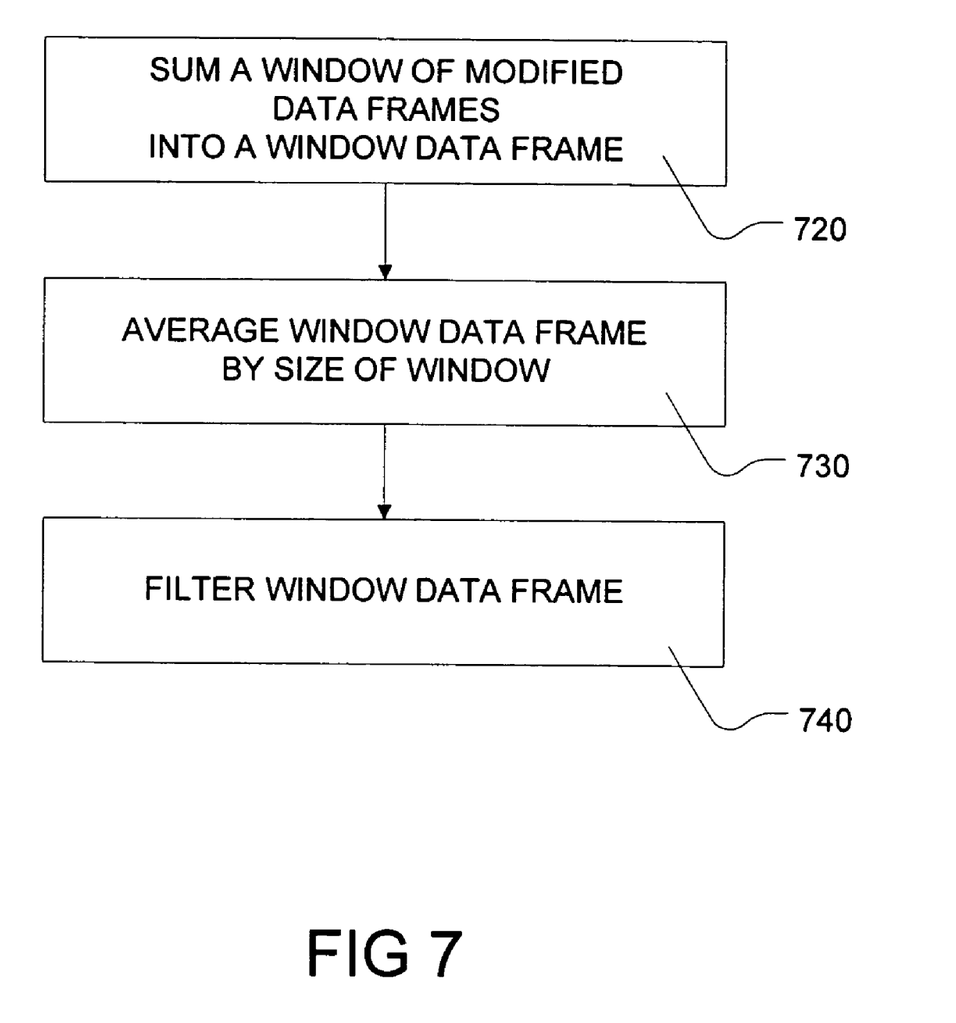
FIG. 7 is a process diagram showing one embodiment of frame summing in the present invention.

FIG. 7 is a diagram showing one embodiment of frame summing process of the present invention. After the inverse mapping and the modified data frame inversion, a plurality of inverted modified data frames or a window of multiple modified data frames are summed, preferably on a frame by frame basis. Then, the average of the summed inverted modified data frames is taken in a window averaging step 730. This resulting averaged summed inverted modified data frame may be filtered as described with regard to FIG. 6 if such filtering has not already been accomplished prior to summing.

As previously described, the watermark signal then can be recovered. One form of frame windowing and summing is described in detail in the present inventor's U.S. patent application Ser. No. 09/758712, entitled WATERMARK RESISTENT TO RESIZING AND ROTATION, assigned to the assignee of the present application and hereby incorporated by reference in its entirety, U.S. patent application Ser. No. 10/884,832, filed Jul. 2, 2004, now U.S. Pat. No. 7,317,811, entitled METHOD TO DECODE TEMPORAL WATERMARKS IN COMPRESSED VIDEO and U.S. patent application Ser. No. 10/882,055, filed Jun. 30, 2004 entitled METHOD TO ENSURE TEMPORAL SYNCHRONIZATION AND REDUCE COMPLEXITY IN THE DETECTION OF TEMPORAL WATERMARKS, assigned to the assignee of the present invention and hereby incorporated by reference in its entirety.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A system for embedding a watermark in a set of at least one presentation data frames, comprising:
   a reversible mapping function for transforming a signal between a first domain and a second domain;
   a set of at least one original visual presentation frames transformable between the first domain and the second domain, the set of at least one original visual presentation frames having visual presentation content presentable in the first domain;
   a geometric watermark pattern transformable between the first domain and second domain, said geometric watermark pattern representing a simple identifiable pattern in the first domain and a complex pattern in the second domain;
   a watermark signal, said watermark signal representing data other than the visual presentation content;
   a combined watermark pattern, said combined watermark pattern formed from said watermark signal combined with said geometric watermark pattern and transformed to the second domain by the reversible mapping function, wherein the combined watermark pattern is added to an absolute value of wavelet coefficients of the visual presentation content in a bipolar wavelet band;
   a processor to form a set of at least one final visual presentation frames, the set of at least one final visual presentation frames formed with the set of at least one original visual presentation frames of the first domain and the combined watermark pattern of the second domain.

2. The system of claim 1, wherein the reversible mapping function is a discrete wavelet transform and the second domain is a wavelet domain.

3. The system of claim 1, wherein the reversible mapping function is a wide sub-band transform and the second domain is a sub-band domain.

4. The system of claim 2, wherein the simple geometric watermark pattern is a checkerboard grid.

5. The system of claim 1, further comprising an additive function, wherein the set of at least one final visual presentation frames are formed from (a) the set of at least one original visual presentation frames and (b) the combined watermark pattern transformed to the second domain, via the additive function.

6. The system of claim 1, further comprising an multiplicative function, wherein the set of at least one final visual presentation frames are formed from (a) the set of at least one original visual presentation frames and (b) the combined watermark pattern transformed to the second domain, via the multiplicative function.

7. The system of claim 2 wherein the discrete wavelet transform is a JPEG-2000 wavelet transform.

8. The system of claim 2 wherein the discrete wavelet transform produces wide bands from either the horizontal or vertical spatial frequencies of the visual presentation data frames.

9. The system of claim 8 wherein the discrete wavelet transform produces approximately two bands from either the horizontal or vertical spatial frequencies of the visual presentation data frames.

10. A method for control of a signal processor for embedding a watermark signal in a set of presentation data frames, comprising the steps of:
    providing a plurality of original visual presentation frames with a visual presentation content presentable in a first domain;
    providing a combined watermark signal having a geometric design with a pattern identifiable in the first domain and a watermark signal;
    mapping the combined watermark signal into a second domain by a reversible mapping function, the function reversible between the second domain and the first domain;
    processing the combined watermark signal and the plurality of original visual presentation frames with a signal processor to produce a plurality of final presentation frames, the plurality of final visual presentation frames having the visual presentation content presentable in the first domain and the mapped combined watermark signal from the second domain, wherein the combined watermark pattern is added to an absolute value of wavelet coefficients of the visual presentation content in a bipolar wavelet band.

11. The method of claim 10, wherein the reversible mapping function is a discrete wavelet transform and the second domain is a wavelet domain.

12. The method of claim 10, wherein the reversible mapping function is a wide sub-band transform and the second domain is a sub-band domain.

13. The method of claim 11, wherein the geometric design is a checkerboard grid.

14. The method of claim 11 wherein the discrete wavelet transform is a JPEG-2000 wavelet transform.

15. The method of claim 11 wherein the discrete wavelet transform produces wide bands from either the horizontal or vertical spatial frequencies of the visual presentation data frames.

16. The method of claim 11 wherein the discrete wavelet transform produces approximately two bands from either the horizontal or vertical spatial frequencies of the visual presentation data frames.

17. The method of claim 11, wherein said geometric design constitutes a grid pattern in the first domain and a complex pattern when transformed to the second domain by the reversible mapping function.

18. The method of claim 11, wherein the step of processing further includes the sub-step of functionally combining the combined watermark signal and the plurality of original visual presentation frames via an addition function.

19. The method of claim 11, wherein the step of processing further includes the sub-step of functionally combining the combined watermark signal and the plurality of original visual presentation frames via a multiplicative function.

20. A system for detecting a watermark signal embedded in a presentation signal, comprising:
a reversible mapping function for translating a signal between a first domain and a second domain;
a set of at least one watermarked presentation frames translatable between the first domain and the second domain, the set of at least one presentation frames having: (a) presentation content presentable in the first domain and but translated in the second domain, (b) a geometric watermark pattern, the geometric watermark pattern representing a simple pattern in the second domain and a complex pattern in the first domain, and (c) a watermark signal, the watermark signal representing data other than the presentation content, the watermark signal combined with the geometric watermark pattern;
a filter for edge and contrast filtering of the translated watermarked presentation frames in the second domain; and
a watermark detector, the watermark detector including a processor configured for translating the set of at least one watermarked presentation frames from the first domain to the second domain with the reversible mapping function, the detector further configured for detecting the simple pattern of the geometric watermark pattern, the detector further configured for recovering the watermark signal from the geometric watermark pattern.

21. The system of claim 20, wherein the reversible mapping function is a discrete wavelet transform.

22. The system of claim 21 wherein the discrete wavelet transform is a JPEG-2000 wavelet transform.

23. The system of claim 20, wherein the reversible mapping function is a wide sub-band transform.

24. The system of claim 20, wherein the watermark detector is further configured for pre-filtering the translated set of at least one watermarked presentation frames in said second domain to remove at least part of said mapped watermarked data frame.

25. The system of claim 20, wherein the watermark detector is further configured for adding multiple translated frames of the set of at least one watermarked presentation frames to enhance the geometric watermark pattern and the watermark signal.

26. A method for control of a signal processor for detecting a watermark signal embedded in a plurality of watermarked frames of a presentation signal, comprising the steps of:
receiving a plurality of watermarked frames each having a presentation content presentable in a first domain, each watermarked frame further including a transformed geometric watermark pattern and a watermark signal, the watermark pattern and watermark signal being transformed from the first domain to a second domain;
mapping the plurality of watermarked frames into the second domain with a reversible mapping function to return the transformed geometric watermark pattern into an identifiable pattern in the second domain, forming a plurality of mapped watermarked frames;
edge and contrast filtering of transformed watermarked presentation frames in the second domain; and
detecting the geometric watermark pattern from the plurality of mapped watermarked frames in said second domain and identifying the watermark signal from the geometric watermark pattern.

27. The method of claim 26, wherein the reversible mapping function is a discrete wavelet transform.

28. The method of claim 27 wherein the discrete wavelet transform is a JPEG-2000 wavelet transform.

29. The method of claim 26, wherein the reversible mapping function is a wide sub-band transform.

30. The method of claim 26, further including the step of pre-filtering the mapped watermarked frames in the second domain to remove at least part of the transformed presentation content without substantially removing the geometric watermark pattern and watermark signal.

31. The method of claim 26, further including the step of summing the plurality of mapped watermarked frames in said second domain to enhance the geometric watermark pattern and watermark signal.

32. A system for protecting a presentation information signal with watermarks comprising:
a watermark embeddor for processing a presentation information signal to combine a watermark therein, the embeddor including:
a watermark assist pattern,
a watermark,
a reversible mapping function for mapping a signal from a first domain into a second domain,
wherein the watermark embeddor is configured for (a) combining the watermark assist pattern and the watermark, (b) transforming the watermark and watermark assist pattern into the second domain by applying the reversible mapping function, (c) combining the transformed watermark assist pattern and transformed watermark with the presentation information signal; and (d) adding the combined watermark assist pattern to an absolute value of wavelet coefficients of the presentation information signal in a bipolar wavelet band; and
a watermark detector for processing a presentation information signal to detect the presence of an embedded watermark, the watermark detector including:
an inverse mapping function corresponding to the reversible mapping function of the embeddor, the inverse mapping function for returning a signal from the second domain to the first domain,
an assist pattern locator, the locator configured to detect the watermark assist pattern and identify the watermark from the detected watermark assist pattern,
wherein the watermark detector is configured to apply the inverse mapping function to a presentation information signal and detect the watermark assist pattern and identify the watermark and the watermark assist pattern from the presentation information signal transformed by the inverse mapping function.

33. The system of claim 32 wherein the reversible mapping function comprises a discrete wavelet transform.

34. The system of claim 33 wherein the discrete wavelet transform is a JPEG-2000 compliant wavelet transform.

35. The system of claim 32 wherein the discrete wavelet transform produces wide bands from either the horizontal or vertical spatial frequencies of the presentation data frames.

36. The system of claim 33 wherein the discrete wavelet transform produces approximately two bands from either the horizontal or vertical spatial frequencies of the presentation data frames.

37. The system of claim 32 wherein the reversible mapping function comprises a wide sub-band transform.

38. The system of claim 32 wherein the watermark assist pattern comprises a geometric configuration.

39. The system of claim 38 wherein the geometric configuration is a checkerboard grid.

40. An apparatus for embedding a watermark into a presentation information signal, the apparatus comprising:

an input device for receiving a presentation information signal;

an output device for transferring a watermarked presentation information signal;

a processor configured with the input device and output device, the processor to control receiving the presentation information signal from the input device and transferring the watermarked presentation information signal to the output device, the processor including executable control instructions for controlling:

processing a plurality of original presentation frames with a presentation content presentable in a first domain from the presentation information signal;

generating a combined watermark signal having a geometric design with a pattern identifiable in the first domain and a watermark signal;

mapping the combined watermark signal into a second domain by a reversible mapping function, the function reversible between the second domain and the first domain;

processing the combined watermark signal and the plurality of original presentation frames to generate a plurality of final presentation frames, the plurality of final presentation frames having the presentation content presentable in the first domain and the mapped combined watermark signal from the second domain, wherein the combined watermark signal is added to an absolute value of wavelet coefficients of the presentation content in a bipolar wavelet band;

forming a watermarked presentation information signal from the plurality of final presentation frames.

41. An apparatus for detecting a watermark from a presentation information signal, the apparatus comprising:

an input device for receiving a watermarked presentation information signal;

an output device for presenting a response in accordance with a watermark from the watermarked presentation information signal;

a processor configured with the input device and output device, the processor to control receiving the watermarked presentation information signal from the input device and generating a response with the output device according to a watermark signal from the watermarked presentation information signal, the processor including executable control instructions for controlling:

processing a plurality of watermarked frames each having a presentation content presentable in a first domain from the watermarked presentation information signal, each watermarked frame further including a transformed geometric watermark pattern and a watermark signal, the watermark pattern and watermark signal being transformed from the first domain to a second domain, mapping the plurality of watermarked frames into the second domain with a reversible mapping function to return the transformed geometric watermark pattern into an identifiable pattern in the second domain, forming a plurality of mapped watermarked frames, and detecting the geometric watermark pattern from the plurality of mapped watermarked frames in the second domain and identifying the watermark signal from the geometric watermark pattern, wherein the detecting comprising edge and contrast filtering of the transformed watermarked frames in the second domain.

* * * * *